United States Patent
Hao

(10) Patent No.: US 9,581,451 B2
(45) Date of Patent: Feb. 28, 2017

(54) REAL-TIME TRAFFIC REPORTING BASED ON RATE OF CHANGE OF TRAFFIC DELAYS

(71) Applicant: Verizon Patent and Licensing Inc., Basking Ridge, NJ (US)

(72) Inventor: Jianxiu Hao, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 132 days.

(21) Appl. No.: 14/254,110

(22) Filed: Apr. 16, 2014

(65) Prior Publication Data

US 2015/0302743 A1 Oct. 22, 2015

(51) Int. Cl.
| | |
|---|---|
| *G06F 19/00* | (2011.01) |
| *G06G 7/70* | (2006.01) |
| *G06G 7/76* | (2006.01) |
| *G01C 21/26* | (2006.01) |
| *G08G 1/01* | (2006.01) |
| *G08G 1/0967* | (2006.01) |

(Continued)

(52) U.S. Cl.
CPC ............ *G01C 21/26* (2013.01); *G08G 1/0112* (2013.01); *G08G 1/0133* (2013.01); *G08G 1/0141* (2013.01); *G08G 1/096716* (2013.01); *G08G 1/096741* (2013.01); *G08G 1/096775* (2013.01); *G08G 1/096811* (2013.01); *G08G 1/096838* (2013.01); *G08G 1/096844* (2013.01); *G08G 1/096883* (2013.01); *G01C 21/3492* (2013.01)

(58) Field of Classification Search
CPC ............. G01C 21/3492; G08G 1/0104; G08G 1/0133; G08G 1/096838; G08G 1/096844; G08G 1/096883
USPC ........................................ 701/117; 455/456.3
See application file for complete search history.

(56) References Cited

U.S. PATENT DOCUMENTS

| | | |
|---|---|---|
| 8,386,168 B2 | 2/2013 | Hao |
| 2009/0105940 A1* | 4/2009 | Bitan ................. G01C 21/3492 701/533 |

(Continued)

OTHER PUBLICATIONS

United States Census Bureau, "Geography", http://www.census.gov/geo/maps-data/data/tiger.html, Feb. 6, 2014, 1 page.

(Continued)

*Primary Examiner* — Isaac Smith

(57) ABSTRACT

A device may receive location information associated with mobile devices. The location information may identify locations associated with the mobile devices. The device may determine speed information associated with the mobile devices. The speed information may identify speeds associated with the mobile devices. The device may identify a traffic segment to be analyzed, and may determine a length of the traffic segment based on the location information and the speed information. The device may calculate a traffic delay associated with the traffic segment based on the length and the speed information. The device may calculate a rate of change of the traffic delay based on calculating the traffic delay, and may provide traffic information based on the rate of change of the traffic delay. The traffic information may identify an expected traffic delay at a future point in time.

20 Claims, 10 Drawing Sheets

(51) Int. Cl.
*G08G 1/0968* (2006.01)
*G01C 21/34* (2006.01)

(56) References Cited

U.S. PATENT DOCUMENTS

2011/0118965 A1* 5/2011 Aben ................ G01C 21/3476
701/117
2011/0319099 A1* 12/2011 Beuk ................ G01C 21/3694
455/456.3

OTHER PUBLICATIONS

Wikipedia, "Shortest path problem", http://en.wikipedia.org/wiki/Shortest_path_problem, May 5, 2014, 8 pages.
Wikipedia, "Dijikstra's algorithm", http://en.wikipedia.org/wiki/Dijkstra%27s_algorithm, Apr. 24, 2014, 10 pages.
Wikipedia, "Bellman-Ford algorithm", http://en.wikipedia.org/wiki/Bellman-Ford_algorithm, May 5, 2014.

* cited by examiner

REAL-TIME TRAFFIC REPORTING BASED ON RATE OF CHANGE OF TRAFFIC DELAYS

BACKGROUND

Traffic congestion is a condition on roads that occurs as use increases, and is characterized by slower speeds, longer trip times, and increased vehicular queuing. The most common example is the physical use of roads by vehicles. When traffic demand is great enough that the interaction between vehicles slows the speed of the traffic stream, this results in traffic congestion.

DETAILED DESCRIPTION OF PREFERRED EMBODIMENTS

The following detailed description of example implementations refers to the accompanying drawings. The same reference numbers in different drawings may identify the same or similar elements.

A user may want to know traffic conditions for a travel route (e.g., a driving route) before the user begins travelling the route or while the user is travelling the route, so that the user can plan a driving route, can schedule an appropriate amount of time to travel the route, etc. Thus, the user may check current traffic conditions. However, current traffic conditions cannot predict how long a traffic delay, associated with a particular traffic segment, will be when the user arrives at the traffic segment at a future point in time. Thus, current traffic conditions do not provide an accurate estimate of travel time (e.g., driving time) to allow a user to accurately schedule an appropriate amount of travel time to travel a particular route. Furthermore, using historical traffic conditions to predict future traffic conditions may be inaccurate when unpredictable or irregular traffic delays occur (e.g., a traffic accident, construction, etc.). Implementations described herein calculate a rate of change of a traffic delay so that a more accurate prediction of a traffic delay can be provided to the user.

Figure 1:
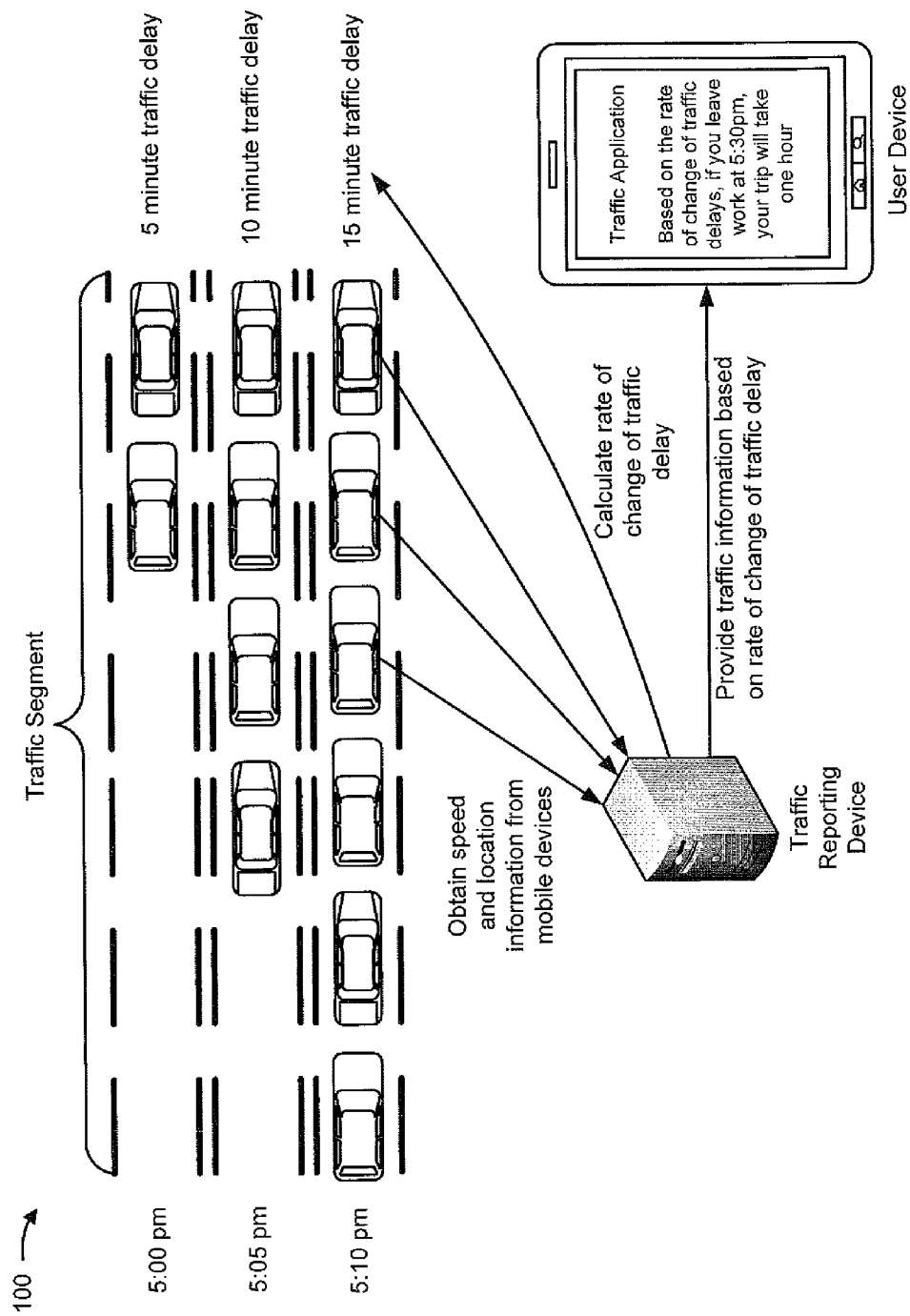
FIG. 1 is a diagram of an overview of an example implementation described herein.

FIG. 1 is a diagram of an overview of an example implementation 100 described herein. As shown in FIG. 1, assume that a particular traffic segment (e.g., a segment of one or more roads) becomes increasingly congested starting at 5:00 pm. Further, assume that a traffic reporting device obtains speed and location information from mobile devices of drivers of cars travelling via the traffic segment. Based on the speed and location information, the traffic reporting device calculates traffic delays at different points in time. For example, assume that the traffic reporting device determines that the traffic segment is associated with a 5 minute traffic delay at 5:00 pm, is associated with a 10 minute traffic delay at 5:05 pm, and is associated with a 15 minute traffic delay at 5:15 pm, as shown.

Based on the different traffic delays at different points in time, the traffic reporting device may calculate a rate of change of the traffic delay. For example, assume that the traffic reporting device calculates that a length of the traffic delay is increasing by one minute for every minute of time that passes. The traffic reporting device may use the calculated rate of change to provide traffic information, such as a predicted amount of traffic delay at a future point in time. For example, a user, interacting with a traffic application on a user device, may request information regarding traffic conditions at some future point in time, such as at 5:30 pm, as shown. The traffic reporting device may use rate of change information, associated with one or more traffic segments included in a travel route of the user, to predict an amount of time the user will spend travelling the travel route at the future point in time. As shown, the traffic reporting device may provide traffic information, that identifies the amount of time, to the user device. In this way, the traffic reporting device may provide more accurate estimates of travel time so that a user may be more prepared for travelling a route.

Figure 2:
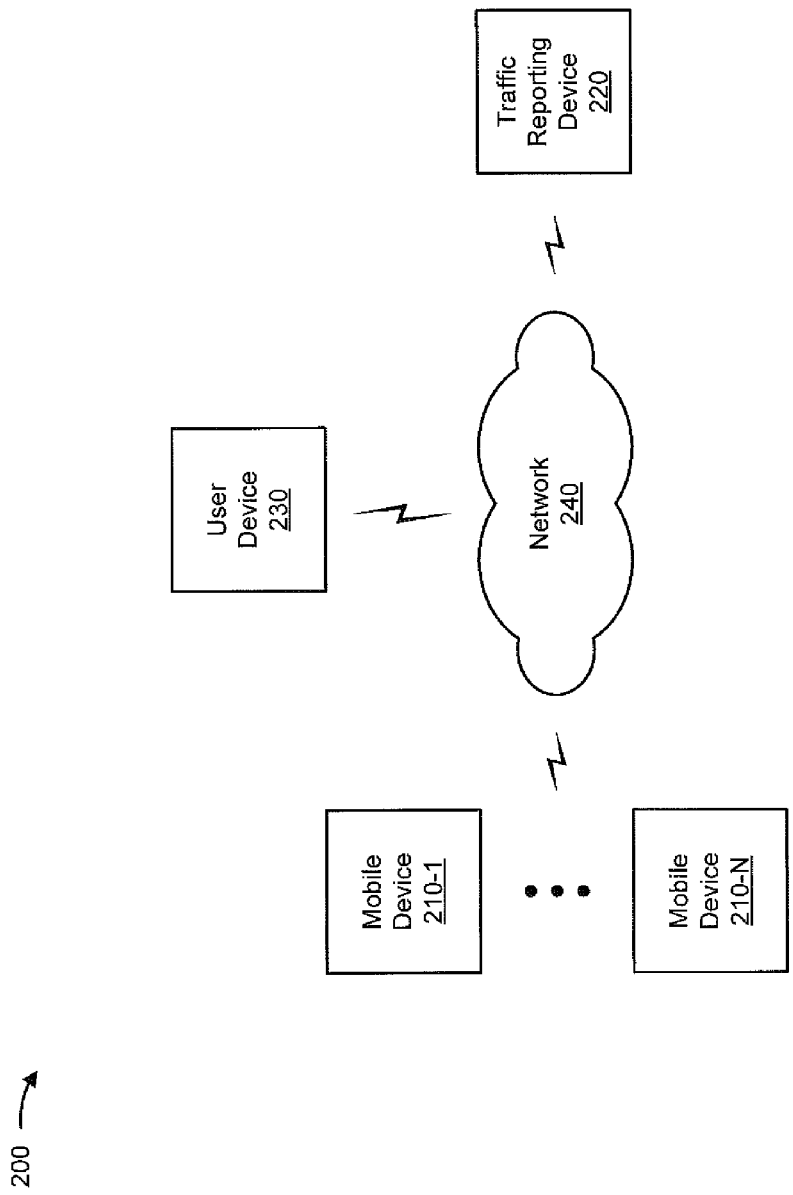
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of mobile devices 210-1 through 210-N (N≥1) (hereinafter referred to collectively as "mobile devices 210," and individually as "mobile device 210"), a traffic reporting device 220, a user device 230, and a network 240. Devices of environment 200 may interconnect via wired connections, wireless connections, or a combination of wired and wireless connections.

Mobile device 210 may include one or more devices capable of receiving, generating, processing, storing, and/or providing information used to calculate a rate of change of a traffic delay. For example, mobile device 210 may include a mobile phone (e.g., a cell phone, a smart phone, a radiotelephone, etc.), a tablet computer, a navigation device (e.g., a global positioning system (GPS) navigation device, an automotive navigation system, a portable navigation device, etc.), or a similar device. In some implementations, mobile device 210 may be associated with an automobile. Mobile device 210 may obtain location information and/or speed information (e.g., using a gyroscope, an accelerometer, GPS, etc.), and may provide the location information and/or the speed information to traffic reporting device 220 (e.g., via network 240).

Traffic reporting device 220 may include one or more devices capable of receiving, generating, processing, storing, and/or providing traffic information and/or information used to calculate a rate of change of a traffic delay. For example, traffic reporting device 220 may include a computing device, such as a server device, or a similar device. In some implementations, traffic reporting device 220 may receive information from one or more mobile devices 210, and may use the received information to calculate a rate of change of a traffic delay. Additionally, or alternatively, traffic reporting device 220 may receive a request for traffic information (e.g., from user device 230), and may provide the requested traffic information, which may include information determined based on a rate of change of a traffic delay.

User device 230 may include one or more devices capable of receiving, generating, processing, storing, and/or providing traffic information. For example, user device 230 may include a computing device, such as a mobile phone (e.g., a cell phone, a smart phone, a radiotelephone, etc.), a tablet computer, a navigation device (e.g., a global positioning system (GPS) navigation device, an automotive navigation system, a portable navigation device, etc.), a desktop computer, a laptop computer, or a similar device. In some implementations, a user may interact with user device 230 to request traffic information from traffic reporting device 220, may receive the requested traffic information, and may provide the requested traffic information for display. In some implementations, user device 230 may be the same device as mobile device 210. In other words, a single device (e.g., capable of performing operations described herein with respect to mobile device 210 and user device 230) may be used to provide location information and/or speed information to traffic reporting device 220, and to request and receive traffic information from traffic reporting device 220.

Network 240 may include one or more wired and/or wireless networks. For example, network 240 may include a cellular network (e.g., a long term evolution (LTE) network, a code division multiple access (CDMA) network, etc.), a public land mobile network (PLMN), a local area network (LAN), a wireless local area network (WLAN), a wide area network (WAN), a metropolitan area network (MAN), a telephone network (e.g., the Public Switched Telephone Network (PSTN)), a near field communication (NFC) network (e.g., a Bluetooth network), an ad hoc network, an intranet, the Internet, a fiber optic-based network, a private network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
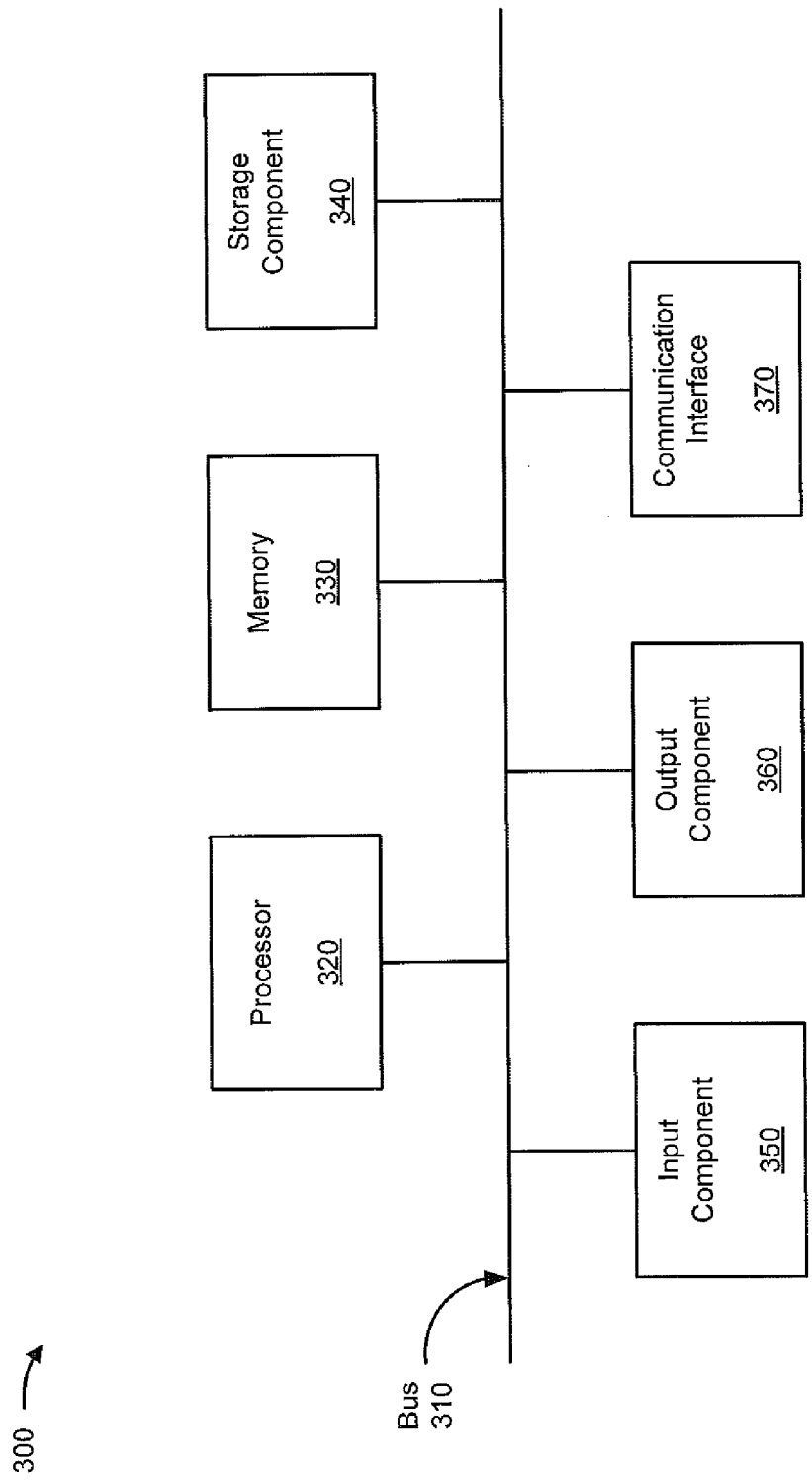
FIG. 3 is a diagram of example components of one or more devices of FIG. 2.

FIG. 3 is a diagram of example components of a device 300. Device 300 may correspond to mobile device 210, traffic reporting device 220, and/or user device 230. In some implementations, mobile device 210, traffic reporting device 220, and/or user device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
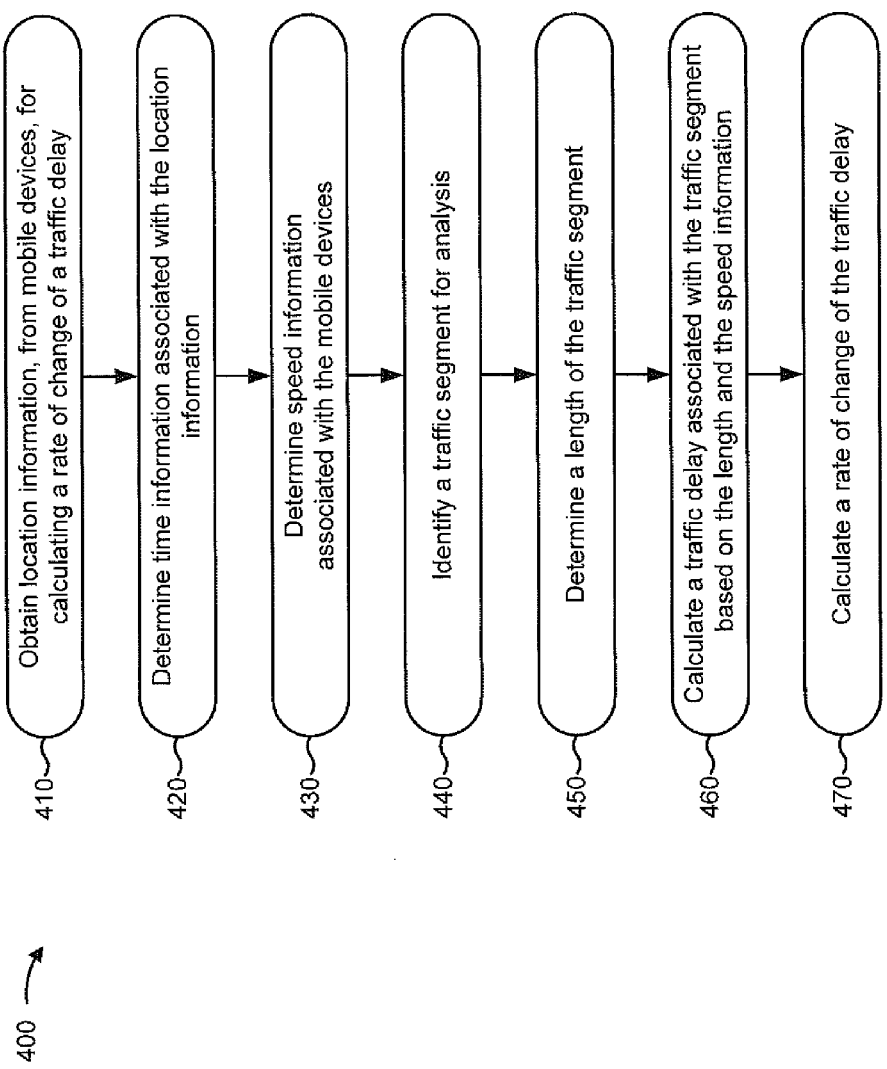
FIG. 4 is a flow chart of an example process for calculating a rate of change of a traffic delay.

FIG. 4 is a flow chart of an example process 400 for calculating a rate of change of a traffic delay. In some implementations, one or more process blocks of FIG. 4 may be performed by traffic reporting device 220. In some implementations, one or more process blocks of FIG. 4 may be performed by another device or a group of devices separate from or including traffic reporting device 220, such as mobile device 210 and/or user device 230.

As shown in FIG. 4, process 400 may include obtaining location information, from mobile devices, for calculating a rate of change of a traffic delay (block 410), and determining time information associated with the location information (block 420). For example, traffic reporting device 220 may obtain, from mobile devices 210, location information. Location information may identify a geographic location associated with mobile device 210. For example, the location information may include a set of coordinates (e.g., numbers) that identifies a geographic location of mobile device 210 (e.g., a latitude coordinate, a longitude coordinate, an elevation coordinate, a GPS coordinate, etc.).

In some implementations, traffic reporting device 220 may identify mobile devices 210 from which to obtain location information. For example, traffic reporting device 220 may identify mobile devices 210 that have been registered to provide location information, may identify mobile devices 210 that are executing a particular application (e.g., a GPS application, a navigation application, a traffic application, etc.), may identify mobile devices 210 within a particular geographic region (e.g., within a geographic region known to be associated with traffic delays, that includes a particular traffic segment, etc.), or the like. Traffic reporting device 220 may obtain location information from the identified mobile devices 210.

In some implementations, traffic reporting device 220 may request the location information from mobile devices 210, and may receive the location information based on the request. For example, traffic reporting device 220 may periodically request location information from mobile devices 210 (e.g., identified mobile devices 210), may request location information from mobile devices 210 within a particular time window (e.g., 7 am to 10 am, 4 pm to 7 pm, a time window known to be associated with rush hour, a time window known to be associated with traffic delays, etc.), etc. Additionally, or alternatively, mobile devices 210 may periodically provide location information to traffic reporting device 220 (e.g., with or without receiving a request from traffic reporting device 220).

Traffic reporting device 220 may determine time information associated with the location information. For example, mobile device 210 may provide, to traffic reporting device 220, information that identifies a time at which mobile device 210 was associated with a location identified by the location information (e.g., a time at which the location information was measured by mobile device 210, a time at which the location information was transmitted to traffic reporting device 220, etc.). Additionally, or alternatively, traffic reporting device 220 may determine a time at which the location information was transmitted by and/or received from mobile device 210.

Traffic reporting device 220 may store the location information and the time information. Traffic reporting device 220 may use the location information and the time information to calculate a rate of change of a traffic delay associated with a traffic segment, as described in more detail elsewhere herein. A traffic segment may refer to a segment of a travel route, such as one or more roads, a segment of one or more roads, etc. While operations described herein are primarily described with respect to driving routes, the operations may be applied to other travel routes, such as train routes, walking routes (e.g., wait times for people standing in queues), etc.

As further shown in FIG. 4, process 400 may include determining speed information associated with the mobile devices (block 430). For example, traffic reporting device 220 may determine speed information associated with mobile devices 210. In some implementations, traffic reporting device 220 may obtain the speed information from mobile devices 210, in a similar manner as obtaining the location information (e.g., described above in connection with block 410). Speed information may refer to a speed and/or a velocity, such as a distance covered in a particular amount of time. Speed information may be determined based on, for example, an amount of elapsed time between a pair of location measurements, an average amount of elapsed time between multiple pairs of location measurements, etc.

Additionally, or alternatively, traffic reporting device 220 may calculate the speed information based on the location information and the time information. For example, traffic reporting device 220 may determine a distance between a first location of mobile device 210 and a second location of mobile device 210 (e.g., based on receiving information that identifies the first location and the second location, either in a single transmission received from mobile device 210 and/or in multiple transmissions received from mobile device 210). Traffic reporting device 220 may determine an amount of elapsed time between a first time when mobile device 210 was associated with the first location and a second time when mobile device 210 was associated with the second location (e.g., based on time information associated with the location information). Traffic reporting device 220 may calculate the speed information based on the distance and the amount of elapsed time, such as by dividing the distance (e.g., in kilometers, meters, miles, yards, etc.) by the amount of elapsed time (e.g., in hours, minutes, seconds, etc.).

Traffic reporting device 220 may determine time information associated with the speed information, in some implementations. For example, mobile device 210 may provide, to traffic reporting device 220, information that identifies a time at which mobile device 210 was associated with a speed identified by the speed information (e.g., a time at which the speed information was measured by mobile device 210, a time at which the speed information was transmitted to traffic reporting device 220, etc.).

Additionally, or alternatively, traffic reporting device 220 may determine a time at which the speed information was transmitted by and/or received from mobile device 210, a time at which the speed information was calculated by traffic reporting device 220, a time and/or a time window associated with the speed information (e.g., a first time associated with a first location used to calculate the speed information, a second time associated with a second location used to calculate the speed information, a time window between the first time and the second time, a time halfway between the first time and the second time, another time between the first time and the second time, etc.), or the like.

Traffic reporting device 220 may store the speed information and the time information. Traffic reporting device 220 may use the speed information and the time information to calculate a rate of change of a traffic delay associated with a traffic segment, as described in more detail elsewhere herein.

As further shown in FIG. 4, process 400 may include identifying a traffic segment for analysis (block 440). For example, traffic reporting device 220 may identify a traffic segment for analysis. In some implementations, traffic reporting device 220 may identify the traffic segment based on a request for traffic information received from user device 230. For example, the request for traffic information may identify a travel route, and traffic reporting device 220 may identify one or more traffic segments included in the travel route.

Additionally, or alternatively, traffic reporting device 220 may identify a problematic traffic segment based on location information, time information, and/or speed information associated with mobile devices 210 associated with the problematic traffic segment. For example, traffic reporting device 220 may use location information to identify mobile devices 210 associated with a location that is within a traffic segment. Traffic reporting device 220 may determine that the traffic segment is a problematic traffic segment based on speed information associated with the traffic segment (e.g., a speed and/or an average speed of mobile devices 210 in the traffic segment being below a threshold), a quantity of mobile devices 210 associated with the traffic segment (e.g., when the quantity satisfies a threshold, this may indicate that the traffic segment is associated with a traffic jam), etc.

As further shown in FIG. 4, process 400 may include determining a length of the traffic segment (block 450). For example, traffic reporting device 220 may determine a length of the traffic segment (e.g., in kilometers, meters, miles, yards, etc.). In some implementations, a length of the traffic segment may be identified, and information that identifies the length may be received by traffic reporting device 220 (e.g., from another device).

In some implementations, traffic reporting device 220 may determine a length of the traffic segment based on the location information and the speed information. For example, a problematic traffic segment may be identified as a traffic segment associated with slow-moving traffic. Traffic reporting device 220 may determine a boundary of a traffic segment as a location where mobile devices 210 on one side of the boundary have a speed that is greater than a threshold, and mobile devices 210 on another side of the boundary have a speed that is less than a threshold. Traffic reporting device 220 may determine a starting boundary and an ending boundary for the traffic segment in this manner, based on the speed information and the location information. Based on the starting boundary and the ending boundary, traffic reporting device 220 may determine a length of the traffic segment.

As further shown in FIG. 4, process 400 may include calculating a traffic delay associated with the traffic segment based on the length and the speed information (block 460). For example, traffic reporting device 220 may calculate a traffic delay associated with the traffic segment based on the length of the traffic segment and based on speed information. In some implementations, traffic reporting device 220 may determine a speed associated with mobile device 210 while mobile device 210 is travelling through the traffic segment (e.g., is within the boundaries of the traffic segment), or may determine an average speed of multiple mobile devices 210 while the multiple mobile devices 210 are travelling through the traffic segment. Traffic reporting device 220 may calculate the traffic delay, associated with the segment, by multiplying the speed (or the average speed) by the length of the traffic segment.

As further shown in FIG. 4, process 400 may include calculating a rate of change of the traffic delay (block 470). For example, traffic reporting device 220 may calculate a rate of change of the traffic delay by determining the traffic delay at multiple points in time. Traffic reporting device 220 may determine a first traffic delay at a first time, may determine a second traffic delay at a second time, and may calculate a difference between the first traffic delay and the second traffic delay to determine a traffic delay difference. Traffic reporting device 220 may further calculate a difference between the first time and the second time to determine a time difference. Traffic reporting device 220 may divide the traffic delay difference by the time difference to calculate the rate of change of the traffic delay.

In some implementations, where the traffic delay increases over time (e.g., the traffic delay difference is positive), the rate of change of the traffic delay may be represented as a positive value. In some implementations, where the traffic delay decreases over time (e.g., the traffic delay difference is negative), the rate of change of the traffic delay may be represented as a negative value.

Traffic reporting device 220 may use historical location information, time information, speed information, lengths, traffic delays, and/or rates of changes of traffic delays to determine a rate of change of a traffic delay, in some implementations. For example, traffic reporting device 220 may compare current conditions to past conditions (e.g., a time window, a day of the week, etc.) to determine historical information to be used to calculate the rate of change of the traffic delay. Additionally, or alternatively, traffic reporting device 220 may use information associated with nearby traffic segments (e.g., within a threshold distance), and direction of traffic travel to calculate a rate of change of a traffic delay for a particular traffic segment.

Traffic reporting device 220 may store the location information, the time information, the speed information, information that identifies the length, information that identifies the traffic delay, and/or information that identifies the rate of change of the traffic delay, and may provide the stored information upon request, or may use the stored information to determine requested traffic information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
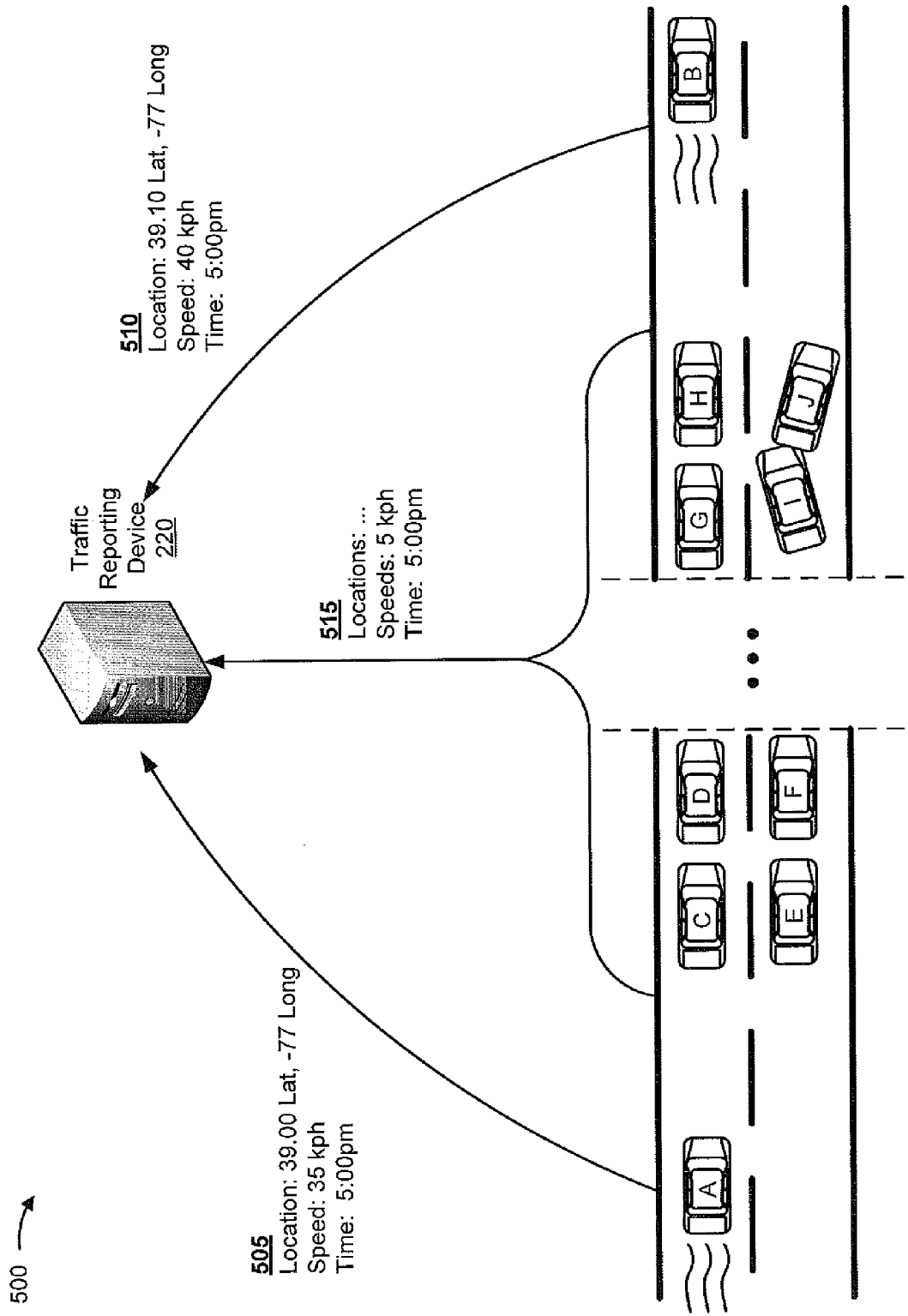
FIGS. 5A-5C are diagrams of an example implementation relating to the example process shown in FIG. 4.
Figure 5B:
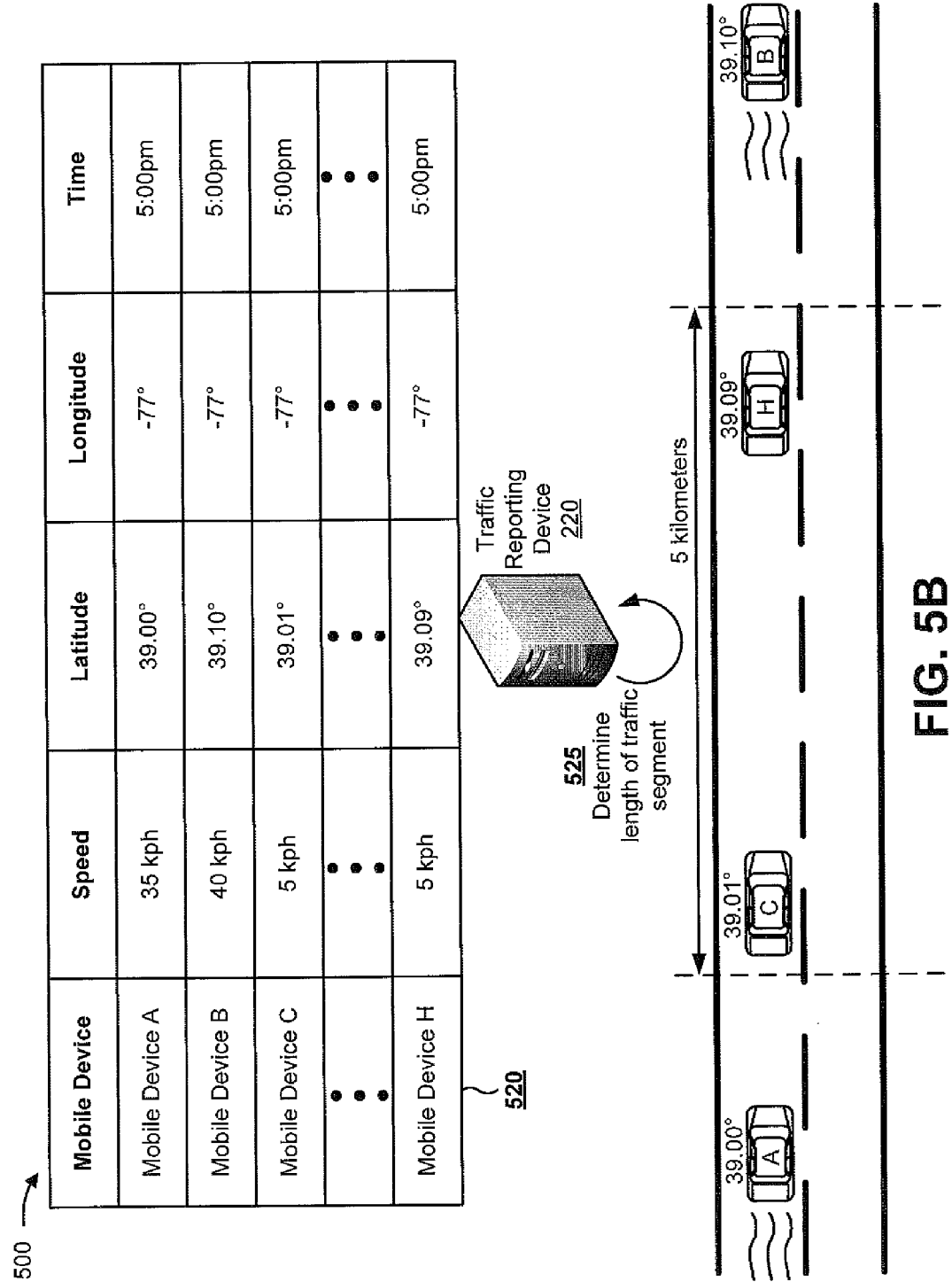
Figure 5C:
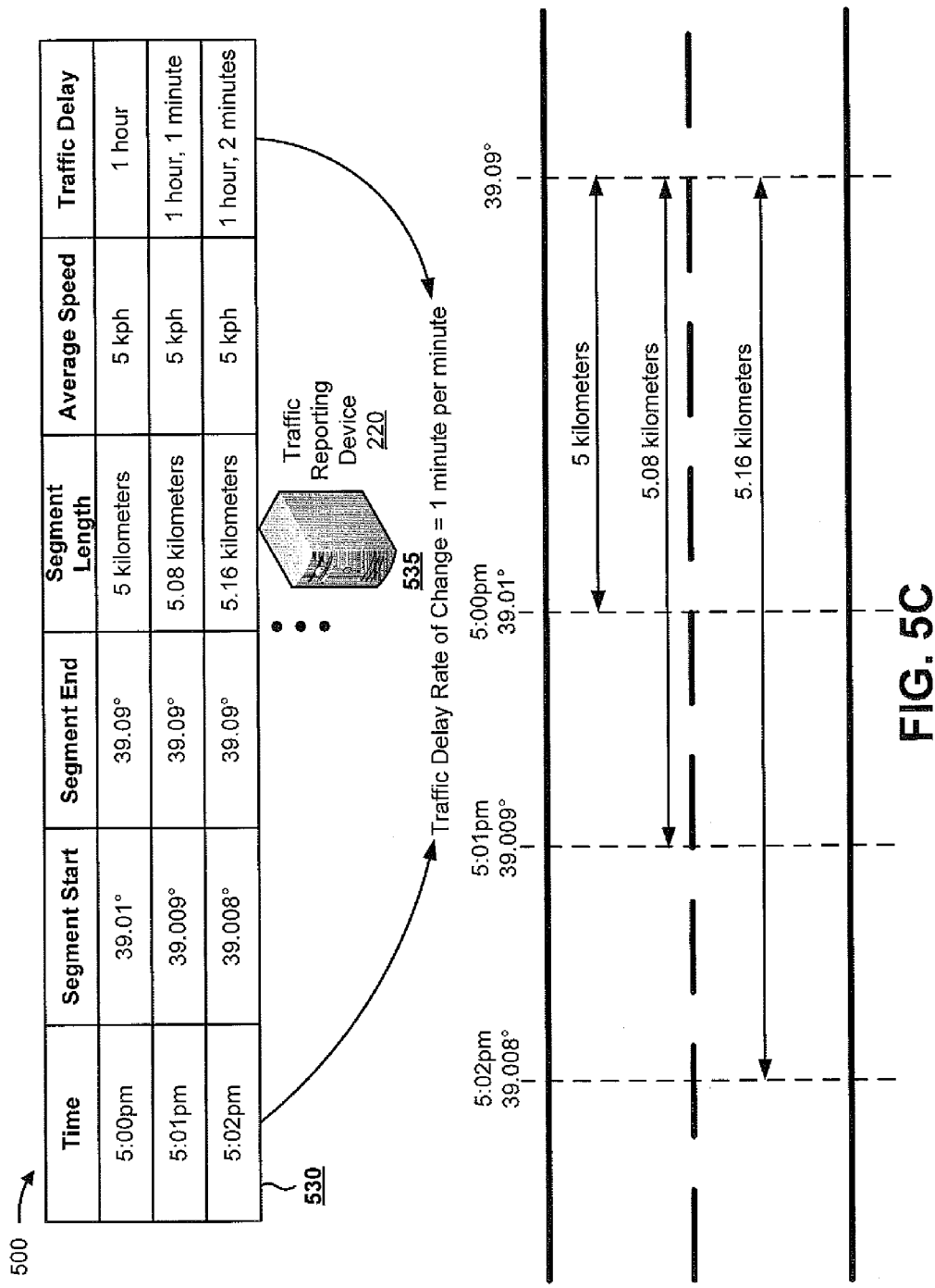

FIGS. 5A-5C are diagrams of an example implementation 500 relating to example process 400 shown in FIG. 4. FIGS. 5A-5C show an example of calculating a rate of change of a traffic delay.

As shown in FIG. 5A, and by reference number 505, assume that traffic reporting device 220 receives, from a first mobile device 210 (Mobile Device A) associated with Vehicle A, information that identifies a location of Mobile Device A, a speed of Mobile Device A, and a time at which the location and speed were measured by Mobile Device A. For example, assume that at 5:00 pm, Mobile Device A had a location of 39.00 degrees latitude and −77 degrees longitude, and a speed of 35 kilometers per hour (kph).

As shown by reference number 510, assume that traffic reporting device 220 receives, from a second mobile device 210 (Mobile Device B) associated with Vehicle B, information that identifies a location of Mobile Device B, a speed of Mobile Device B, and a time at which the location and speed were measured by Mobile Device B. For example, assume that at 5:00 pm, Mobile Device B had a location of 39.10 degrees latitude and −77 degrees longitude, and a speed of 40 kph.

As shown by reference number 515, assume that traffic reporting device 220 receives, from other mobile devices 210 (Mobile Device C through Mobile Device J) associated with other vehicles (Vehicles C through J), information that identifies locations of the mobile devices 210, speeds of the mobile devices 210, and times at which the locations and speeds were measured by mobile devices 210. For example, assume that at 5:00 pm, Mobile Devices C through J had speeds of 5 kph, and locations as described in connection with FIG. 5B.

As shown in FIG. 5B, and by reference number 520, assume that traffic reporting device 220 stores the location information, the speed information, and the time information received from Mobile Devices A through J (although information associated with a smaller quantity of mobile devices 210 is shown in FIG. 5B). Based on the stored information, traffic reporting device 220 determines boundaries of a problematic traffic segment. For example, assume that traffic reporting device 220 determines that vehicles located between 39.01 degrees latitude and 39.09 degrees latitude (e.g., with a longitude of −77 degrees) are travelling slowly (e.g., Vehicles C through H), with an average speed of 5 kph.

Further, assume that traffic reporting device 220 determines that vehicles located outside of these boundaries (e.g., outside of 39.01 degrees latitude and 39.09 degrees latitude) are travelling quickly relative to the vehicles inside the boundary. For example, Vehicle A is travelling at a speed of 35 kph at 39.00 degrees latitude and −77 degrees longitude, and Vehicle B is travelling at a speed of 40 kph at 39.10 degrees latitude and −77 degrees longitude. Thus, assume that traffic reporting device 220 determines that the problematic traffic segment is located between 39.01 degrees latitude/−77 degrees longitude and 39.09 degrees latitude/−77 degrees longitude. As shown by reference number 525, assume that traffic reporting device 220 uses the location of the boundaries of the traffic segment to determine that the length of the traffic segment is 5 kilometers.

As shown in FIG. 5C, and by reference number 530, assume that traffic reporting device 220 performs the operations shown in FIGS. 5A and 5B at different times. As shown, assume traffic reporting device 220 determines that, at 5:01 pm, the problematic traffic segment has boundaries of 39.009 degrees latitude/−77 degrees longitude and 39.09 degrees latitude/−77 degrees longitude, a length of 5.08 kilometers (e.g., determined based on the boundaries), and that vehicles travelling on the traffic segment have an average speed of 5 kph. Assume that traffic reporting device 220 performs similar calculations at 5:02 pm, as shown.

Further, assume that traffic reporting device 220 determines, based on the traffic segment length and the average speed, that the traffic delay associated with the traffic segment (e.g., the length of time it takes to travel the traffic segment) is 1 hour at 5:00 pm, is 1 hour and 1 minute at 5:01 pm, is 1 hour and 2 minutes at 5:02 pm, etc. Based on the change in traffic delay at the different times, assume that traffic reporting device 220 calculates a rate of change of the traffic delay (e.g., an average rate of change) of 1 minute per minute (e.g., when 1 minute passes, the traffic delay increases by 1 minute), as shown by reference number 535. Traffic reporting device 220 may use the rate of change of the traffic delay to provide traffic information, as described in more detail elsewhere herein.

As indicated above, FIGS. 5A-5C are provided merely as an example. Other examples are possible and may differ from what was described with regard to FIGS. 5A-5C.

Figure 6:
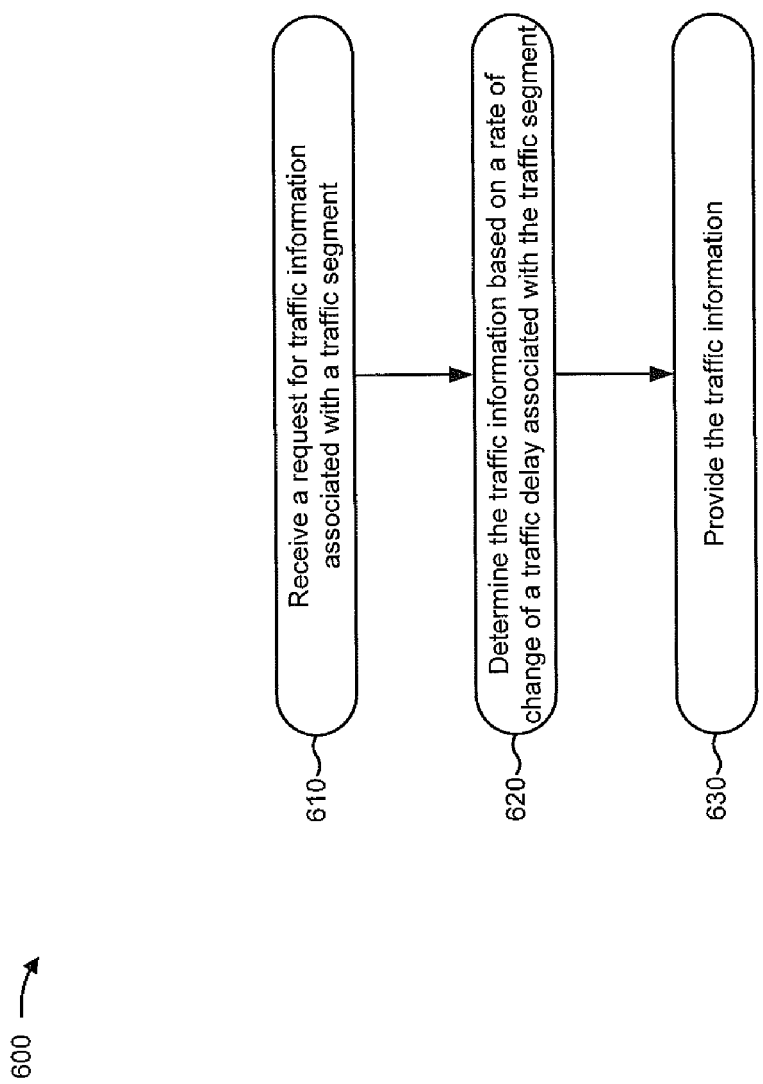
FIG. 6 is a flow chart of an example process for providing traffic information based on a rate of change of a traffic delay.

FIG. 6 is a flow chart of an example process 600 for providing traffic information based on a rate of change of a traffic delay. In some implementations, one or more process blocks of FIG. 6 may be performed by traffic reporting device 220. In some implementations, one or more process blocks of FIG. 6 may be performed by another device or a group of devices separate from or including traffic reporting device 220, such as mobile device 210 and/or user device 230.

As shown in FIG. 6, process 600 may include receiving a request for traffic information associated with a traffic segment (block 610), determining the traffic information based on a rate of change of a traffic delay associated with the traffic segment (block 620), and providing the traffic information (block 630). For example, traffic reporting device 220 may receive (e.g., from mobile device 210 and/or user device 230) a request for traffic information. The request for traffic information may include, for example, a request for navigational information for a travel route, a request for directions (e.g., driving directions) for a travel route, a request for a travel time (e.g., a driving time, an estimated driving time, etc.) required to travel a travel route, etc.

Traffic reporting device 220 may determine one or more traffic segments included in a travel route associated with the request. For example, traffic reporting device 220 may determine a travel route based on the request (e.g., a travel route between two locations identified in the request), and may determine one or more traffic segments included in the travel route. Traffic reporting device 220 may determine a rate of change of a traffic delay associated with the traffic segment(s), as described in more detail elsewhere herein. Traffic reporting device 220 may provide the traffic information based on the rate of change of the traffic delay(s).

As an example, assume that a user interacts with user device 230 to request driving directions between two locations. Traffic reporting device 220 may determine a travel route between the two locations, and may calculate a time to travel the travel route. The calculated time may be based on the rate of change of a traffic delay associated with one or more traffic segments included in the travel route. For example, traffic reporting device 220 may determine a time at which the user is expected to arrive at a boundary of a traffic segment (e.g., based on information provided by the user, based on calculating a driving time for the user to arrive at the boundary, etc.), and may determine an expected traffic delay for the traffic segment, at the expected arrival time, based on the rate of change of the traffic delay.

As another example, a user may request to compare different travel routes between two locations. Traffic reporting device 220 may compare expected travel times for each travel route (e.g., based on calculating a rate of change of multiple delays), and may provide information that identifies a travel time for each travel route. Additionally, or alternatively, traffic reporting device 220 may provide information that identifies a recommended travel route (e.g., with a shortest travel time). In this way, a user may obtain an accurate estimate of travel time, and may select a travel route to save time.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
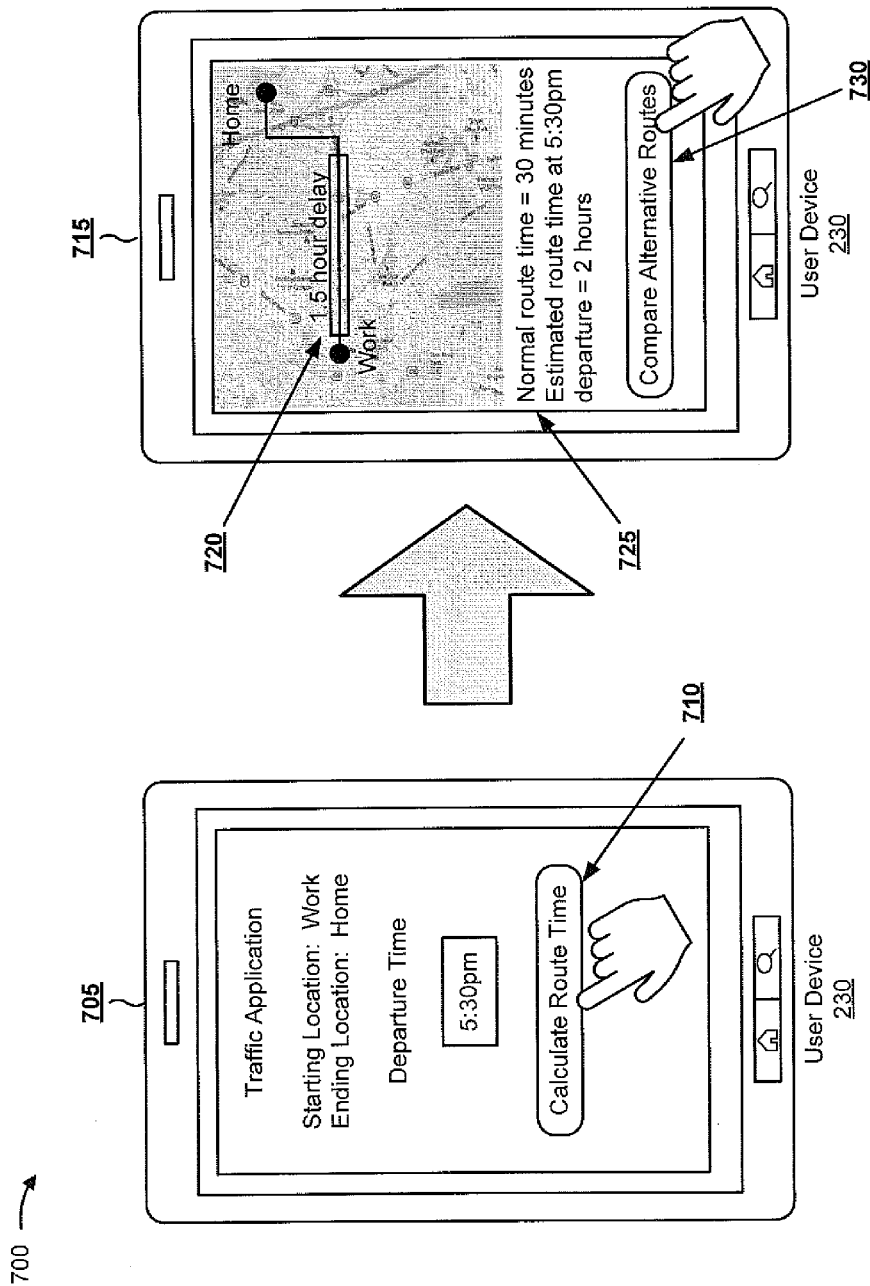
FIGS. 7A and 7B are diagrams of an example implementation relating to the example process shown in FIG. 6.
Figure 7B:
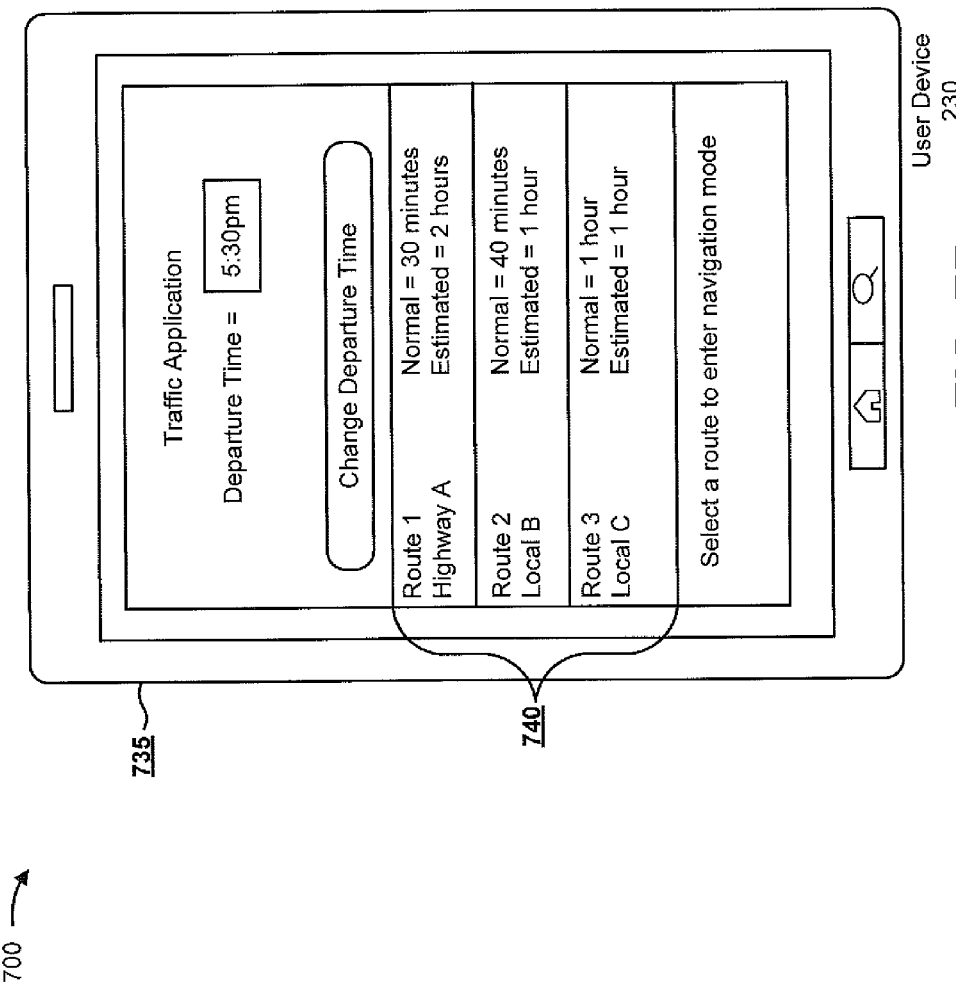

FIGS. 7A and 7B are diagrams of an example implementation 700 relating to example process 600 shown in FIG. 6. FIGS. 7A and 7B show an example of providing traffic information based on a rate of change of a traffic delay.

As shown in FIG. 7A, and by reference number 705, assume that a user interacts with a traffic application, via user device 230, to request directions from the user's workplace to the user's home. Further, assume that the current time is 4:45 pm, and assume that the user inputs a departure time of 5:30 pm, when the user expects to depart work. As shown by reference number 710, assume that the user interacts with a "Calculate Route Time" button, which causes the request to be provided to traffic reporting device 220. Assume that traffic reporting device 220 uses a rate of change of a traffic delay to estimate a travel time for a travel route, between the user's workplace and the user's home, based on the departure time of 5:30 pm. For example, traffic reporting device 220 may use the rate of change of the traffic delay to calculate an expected traffic delay associated with a traffic segment, included in the travel route from the user's workplace to the user's home, at a future time (e.g., at 5:30 pm, at a time when the user is expected to arrive at the traffic segment, etc.).

As shown by reference number 715, assume that traffic reporting device 220 provides the requested traffic information to user device 230, and that user device 230 provides the requested traffic information for display. For example, assume that user device 230 indicates a problematic traffic segment, and a traffic delay associated with the problematic traffic segment (e.g., a 1.5 hour delay), as shown by reference number 720. As shown by reference number 725, assume that user device 230 provides information identifying a normal route time (e.g., without traffic delays) of 30 minutes, and an estimated route time of 2 hours (e.g., incorporating the problematic traffic segment delay of 1.5 hours) when the user departs the workplace at 5:30 pm. As shown by reference number 730, assume that the user interacts with an input mechanism (e.g., a "Compare Alternative Routes" button) to compare alternative travel routes.

As shown in FIG. 7B, and by reference number 735, assume that user device 230 provides a user interface to compare alternative travel routes based on the user interaction. For example, user device 230 may request traffic information for alternative travel routes, between the user's workplace and the user's home, from traffic reporting device 220. Traffic reporting device 220 may use a rate of change of traffic delays associated with traffic segments included in the alternative travel routes to calculate an estimated travel time for each travel route at the departure time of 5:30 pm. As shown by reference number 740, traffic reporting device 220 may provide the traffic information to user device 230, and user device 230 may provide the traffic information for display. In this way, a user may compare alternative travel routes based on expected travel times, which may be estimated based on a rate of change of a traffic delay.

As indicated above, FIGS. 7A and 7B are provided merely as an example. Other examples are possible and may differ from what was described with regard to FIGS. 7A and 7B.

Implementations described herein calculate a rate of change of a traffic delay so that a more accurate prediction of a traffic delay can be provided to a user.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive first location information associated with a first plurality of mobile devices,
the first location information identifying respective locations associated with the first plurality of mobile devices;
determine first speed information associated with the first plurality of mobile devices,
the first speed information identifying respective speeds associated with the first plurality of mobile devices, and
the first speed information being determined based on information provided by the first plurality of mobile devices;
identify a traffic segment to be analyzed;
determine a first length of the traffic segment based on the first location information and the first speed information;
calculate a first traffic delay associated with the traffic segment based on the first length and the first speed information;
obtain a second traffic delay associated with the traffic segment,
the second traffic delay being based on a second length of the traffic segment,
the second length being based on second location information, associated with a second plurality of mobile devices, and second speed information associated with the second plurality of mobile devices;
calculate a rate of change of traffic delay based on the first traffic delay and the second traffic delay;
receive a request for traffic information,
the request including a future departure time received by the device and based on an input; and
provide the traffic information based on the rate of change of the traffic delay and based on the request, the traffic information identifying an expected traffic delay at the future departure time.

2. The device of claim 1, where the one or more processors are further to:
calculate the second traffic delay based on the second length and the second speed information.

3. The device of claim 1, where the one or more processors, when calculating the rate of change of the traffic delay, are to:
calculate the rate of change of the traffic delay based on the first traffic delay, the second traffic delay, a first time associated with the first traffic delay, and a second time associated with the second traffic delay.

4. The device of claim 1, where the one or more processors are further to:
receive information that identifies a travel route; and
where the one or more processors, when identifying the traffic segment, are to:
identify the traffic segment based on the travel route, the traffic segment being a portion of the travel route.

5. The device of claim 1, where the one or more processors are further to:
receive information that identifies an arrival time at which an arrival at the traffic segment is expected;
calculate the expected traffic delay based on the rate of change of the traffic delay, the future departure time, and the arrival time; and where the one or more processors, when providing the traffic information, are to:
provide the traffic information based on calculating the expected traffic delay.

6. The device of claim 1, where the one or more processors are further to:
receive information that identifies a geographic region associated with the traffic segment;
identify the first plurality of mobile devices based on the information that identifies the geographic region,
the first plurality of mobile devices being located within the geographic region; and
where the one or more processors, when receiving the first location information and determining the first speed information, are to:
receive the first location information from the identified first plurality of mobile devices; and
determine the first speed information based on the identified first plurality of mobile devices.

7. The device of claim 1, where the one or more processors, when identifying the traffic segment, are to:
receive the request for the traffic information,
the request identifying at least a portion of a travel route; and
identify the traffic segment based on the travel route,
the traffic segment being included in the travel route.

8. A non-transitory computer-readable medium storing instructions, the instructions comprising:
one or more instructions that, when executed by one or more processors, cause the one or more processors to:
receive first location information associated with a first plurality of mobile devices,
the first location information identifying respective locations associated with the first plurality of mobile devices;
determine first speed information associated with the first plurality of mobile devices,
the first speed information identifying respective speeds associated with the first plurality of mobile devices, and
the first speed information being determined based on information provided by the first plurality of mobile devices;
identify a traffic segment to be analyzed,
the traffic segment being associated with the first plurality of mobile devices;
determine a first length of the traffic segment based on the first location information and the first speed information;
calculate a first traffic delay associated with the traffic segment based on the first length and the first speed information;
obtain a second traffic delay associated with the traffic segment,
the second traffic delay being based on a second length of the traffic segment,
the second length being based on second location information, associated with a second plurality of mobile devices, and second speed information associated with the second plurality of mobile devices;
calculate a rate of change of traffic delay based on the first traffic delay and the second traffic delay;
receive a request for directions including a future point in time based on an input;

calculate an expected traffic delay at the future point in time based on the rate of change of the traffic delay and based on the request for directions; and provide traffic information based on the expected traffic delay at the future point in time.

9. The non-transitory computer-readable medium of claim 8, where the one or more instructions, when executed by the one or more processors, further cause the one or more processors to:

calculate the second traffic delay based on the second length and the second speed information.

10. The non-transitory computer-readable medium of claim 8, where the one or more instructions, when calculating the rate of change of the traffic delay, cause the one or more processors to:

calculate the rate of change of the traffic delay based on the first traffic delay, the second traffic delay, a first time associated with the first traffic delay, and a second time associated with the second traffic delay.

11. The non-transitory computer-readable medium of claim 8, where the one or more instructions, when executed by the one or more processors, further cause the one or more processors to:

receive the first speed information from the first plurality of mobile devices.

12. The non-transitory computer-readable medium of claim 8, where the one or more instructions, when receiving the first location information, cause the one or more processors to:

receive information that identifies a first location and a first time associated with a mobile device of the first plurality of mobile devices; and receive information that identifies a second location and a second time associated with the mobile device; and where the one or more instructions, when executed by the one or more processors, further cause the one or more processors to:

calculate the first speed information based on the first location, the second location, the first time, and the second time.

13. The non-transitory computer-readable medium of claim 8, where the one or more instructions, when determining the first length of the traffic segment, cause the one or more processors to:

determine a first boundary of the traffic segment based on the first location information and the first speed information;

determine a second boundary of the traffic segment based on the first location information and the first speed information; and determine the first length of the traffic segment based on the first boundary and the second boundary.

14. The non-transitory computer-readable medium of claim 13, where the one or more instructions, when determining the first boundary, cause the one or more processors to:

determine that a first speed associated with one or more first mobile devices, of the first plurality of mobile devices, satisfies a threshold;

determine that a second speed associated with one or more second mobile devices, of the first plurality of mobile devices, does not satisfy the threshold; and determine, as the first boundary, a location between a first location, associated with the one or more first mobile devices, and a second location associated with the one or more second mobile devices.

15. A method, comprising:

receiving, by a device, first location information associated with a first plurality of mobile devices, the first location information identifying respective locations associated with the first plurality of mobile devices;

determining, by the device, first speed information associated with the first plurality of mobile devices, the first speed information identifying respective speeds associated with the first plurality of mobile devices, and the first speed information being determined based on information provided by the first plurality of mobile devices;

identifying, by the device, a traffic segment to be analyzed;

determining, by the device, a first length of the traffic segment based on the first location information and the first speed information;

determining, by the device, a first traffic delay associated with the traffic segment based on the first length and the first speed information;

obtaining, by the device, a second traffic delay associated with the traffic segment, the second traffic delay being based on a second length of the traffic segment, the second length being based on second location information, associated with a second plurality of mobile devices, and second speed information associated with the second plurality of mobile devices;

determining, by the device, a rate of change of traffic delay based on the first traffic delay and the second traffic delay;

receiving, by the device, a request including a future point in time based on an input;

determining, by the device, an expected traffic delay at the future point in time based on the rate of change of the traffic delay and based on the request; and providing, by the device, information that identifies the expected traffic delay.

16. The method of claim 15, where determining the rate of change of the traffic delay comprises:

determining a first difference between the first traffic delay and the second traffic delay;

determining a second difference between a first time, associated with the first traffic delay, and a second time associated with the second traffic delay; and determining the rate of change of the traffic delay based on the first difference and the second difference.

17. The method of claim 15, further comprising:

calculating the second traffic delay based on the second length and the second speed information.

18. The method of claim 15, where identifying the traffic segment to be analyzed comprises:

identifying the traffic segment to be analyzed based on the first location information and the first speed information, the traffic segment being associated with one or more respective speeds that are below a threshold.

19. The method of claim 15, further comprising:

receiving information that identifies an arrival time at which an arrival at the traffic segment is expected; and where determining the expected traffic delay comprises:

determining the expected traffic delay based on the rate of change of the traffic delay, the request, and the arrival time.

20. The method of claim 15, further comprising:
receiving the second speed information from the second plurality of mobile devices; and
calculating the second traffic delay based on the received second speed information.

* * * * *